(12) United States Patent
Cheng

(10) Patent No.: US 10,767,578 B2
(45) Date of Patent: Sep. 8, 2020

(54) ENERGY SAVING DEVICE FOR INTERNAL COMBUSTION ENGINE

(71) Applicant: Ming-Hung Cheng, Xiushui Township (TW)

(72) Inventor: Ming-Hung Cheng, Xiushui Township (TW)

(*) Notice: Subject to any disclaimer, the term of this patent is extended or adjusted under 35 U.S.C. 154(b) by 13 days.

(21) Appl. No.: 16/227,184

(22) Filed: Dec. 20, 2018

(65) Prior Publication Data

US 2020/0003138 A1 Jan. 2, 2020

(30) Foreign Application Priority Data

Jun. 29, 2018 (TW) .............................. 107208788 U

(51) Int. Cl.
| | |
|---|---|
| *F02D 41/00* | (2006.01) |
| *F02M 35/10* | (2006.01) |
| *F02B 39/10* | (2006.01) |
| *F02B 39/16* | (2006.01) |
| *F02B 33/34* | (2006.01) |

(52) U.S. Cl.
CPC .......... *F02D 41/0007* (2013.01); *F02B 33/34* (2013.01); *F02B 39/10* (2013.01); *F02B 39/16* (2013.01); *F02M 35/10157* (2013.01); *F02D 2200/101* (2013.01)

(58) Field of Classification Search
CPC .......... F02B 33/34; F02B 39/10; F02B 39/16; F02D 41/0007; F02D 2200/101; F02D 2200/501; F02M 35/10157
See application file for complete search history.

(56) References Cited

U.S. PATENT DOCUMENTS

| | | | |
|---|---|---|---|
| 9,555,751 B1* | 1/2017 | Cheng | F02B 33/34 |
| 2016/0344747 A1* | 11/2016 | Link, II | G06F 21/44 |
| 2019/0368601 A1* | 12/2019 | Jacobs | F16H 61/0202 |

* cited by examiner

*Primary Examiner* — Brandon D Lee
(74) *Attorney, Agent, or Firm* — Alan D. Kamrath; Karin L. Williams; Mayer & Williams PC

(57) ABSTRACT

An energy saving device includes a control box, a battery, an operation setting system, a car speed sensor assembly, and an air intake fan motor. Thus, the IC chip of the car speed sensor assembly identifies the car speed information detected by the five car speed sensors of the car speed sensor assembly, and transmits the car speed information to the IC circuit board of the control box, and the IC circuit board controls and regulates the rotation speed of the air intake fan motor according to the grades of the car speed preset by the operation setting system, such that the rotation speed of the air intake fan motor increases the air flow rate by a grade when the car speed is increased by a predetermined constant value.

10 Claims, 4 Drawing Sheets

ENERGY SAVING DEVICE FOR INTERNAL COMBUSTION ENGINE

BACKGROUND OF THE INVENTION

1. Field of the Invention

The present invention relates to a power supercharger (or booster) for an internal combustion engine and, more particularly, to an energy saving device for an internal combustion engine.

2. Description of the Related Art

A conventional mechanic supercharger for an internal combustion engine comprises a belt, a belt wheel and an air intake fan. The power of the internal combustion engine is transmitted through the belt and the belt wheel to the air intake fan. When the internal combustion engine is operated, it drives the belt and the belt wheel to operate the air intake fan, so as to increase the volume or flow rate of the air that flows through an air inlet pipe into the internal combustion engine, thereby enhancing the working efficiency of the internal combustion engine. However, the air volume cannot be controlled by the computer exactly, so that the air volume is too large during operation. Thus, when the car is driven at a high speed, the injected fuel volume is too great due to the large air volume, such that the fuel is greatly consumed and wasted due to an incomplete combustion. In addition, the incomplete combustion easily produces carbon deposit. Further, the conventional mechanic supercharger continues to operate when the internal combustion engine is disposed at an idle state, thereby causing a noise problem.

A conventional turbine-type supercharger for an internal combustion engine comprises a turbine. The turbine is driven and rotated by the waste gas produced during operation the internal combustion engine, so as to increase the volume or flow rate of the air that flows through an air inlet pipe into the internal combustion engine, thereby enhancing the working efficiency of the internal combustion engine. However, the internal combustion engine only produces less waste gas when it is operated at a lower rotation speed, such that the turbine cannot be rotated efficiently, thereby easily producing an air intake delay. Thus, the turbine is operated when the rotation speed of the internal combustion engine is higher than a predetermined value, such that when the car is driven at a low speed, the power cannot be enhanced. In addition, the injected fuel volume cannot be controlled exactly, such that the conventional turbine-type supercharger cannot achieve an energy-saving function.

BRIEF SUMMARY OF THE INVENTION

The primary objective of the present invention is to provide an energy saving device with a carbon (or charcoal) removing function to prevent carbon deposit.

In accordance with the present invention, there is provided an energy saving device comprising a control box, a battery, an operation setting system, a car speed sensor assembly, and an air intake fan motor. The control box includes an IC circuit board which is electrically connected with the battery, the operation setting system, the car speed sensor assembly, and the air intake fan motor. The battery is electrically connected with the IC circuit board of the control box, to provide an electric power to actuate the air intake fan motor. The operation setting system is electrically connected with the IC circuit board of the control box, and includes an operation setting monitor which presets a plurality of grades according to a car speed and an air flow rate of the air intake fan motor. The car speed sensor assembly includes a first car speed sensor for a car propeller shaft, a second car speed sensor for an ABS brake system, a third car speed sensor for an EBS brake system, a fourth car speed sensor for a PDF spark ignition system, and a fifth car speed sensor for a GPS. The car speed sensor assembly is provided with an IC chip which is electrically connected with the IC circuit board of the control box. The IC chip of the car speed sensor assembly identifies a car speed information detected by the first car speed sensor, the second car speed sensor, the third car speed sensor, the fourth car speed sensor, and the fifth car speed sensor, and transmits the car speed information to the IC circuit board of the control box. The air intake fan motor is electrically connected with the IC circuit board of the control box. The air intake fan motor is located at a front position of an air inlet pipe of an internal combustion engine. The air intake fan motor drives and rotates an air intake fan.

According to the primary advantage of the present invention, the IC chip of the car speed sensor assembly identifies the car speed information detected by the five car speed sensors of the car speed sensor assembly, and transmits the car speed information to the IC circuit board of the control box, and the IC circuit board of the control box controls and regulates the rotation speed of the air intake fan motor according to the grades of the car speed preset by the operation setting system that is controlled by the user, such that the rotation speed of the air intake fan motor increases the air flow rate by a grade when the car speed is increased by a predetermined constant value.

According to another advantage of the present invention, the energy saving device efficiently increases the air intake amount of the internal combustion engine, without increasing the rotation speed of the internal combustion engine, and without increasing the oil injection amount, such that the fuel is burned completely, thereby preventing the internal combustion engine from producing carbon deposit, and thereby enhancing the working efficiency of the internal combustion engine.

According to a further advantage of the present invention, the car travels a longer distance under the same oil volume, so as to achieve the energy-saving purpose.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
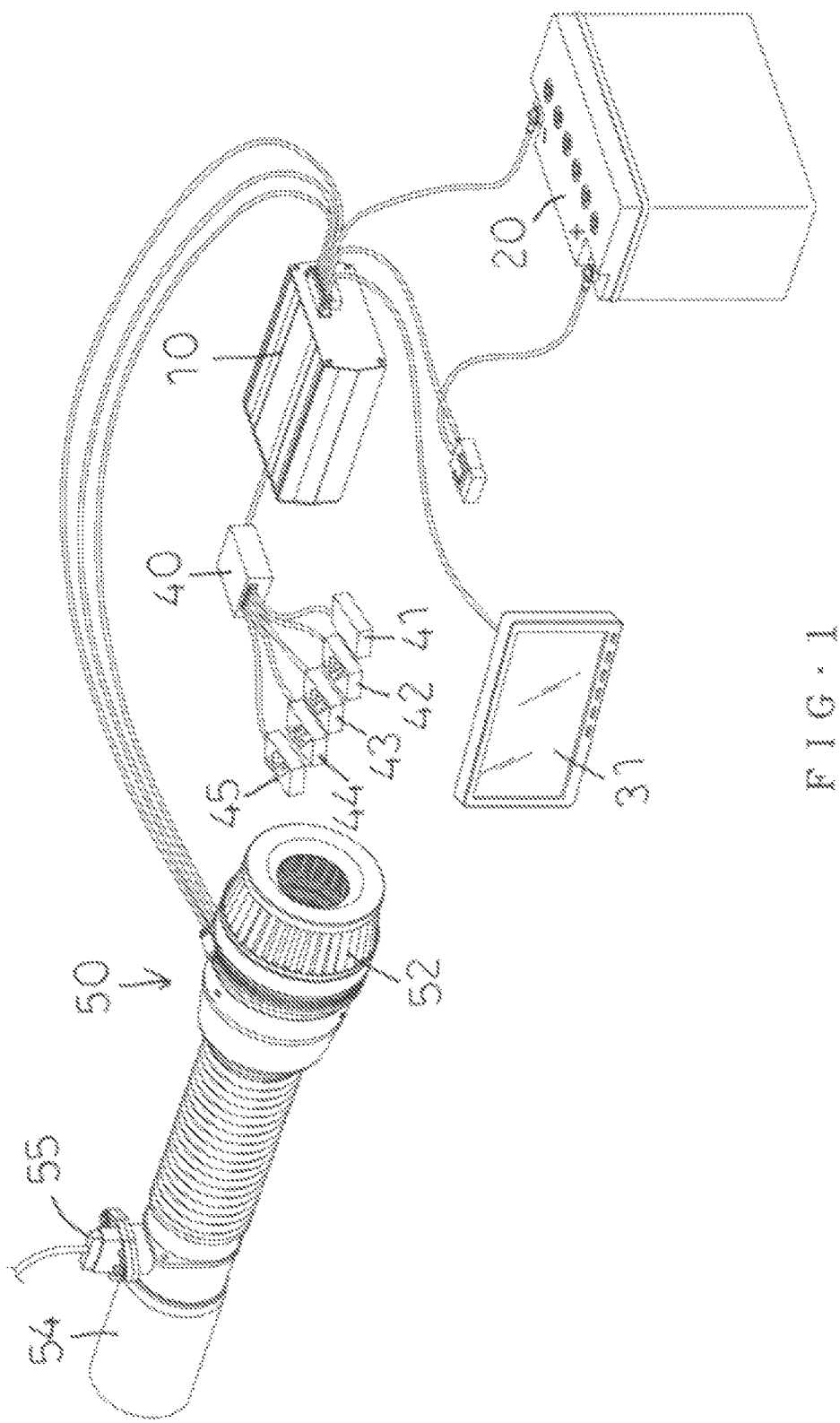
FIG. 1 is a perspective view of an energy saving device in accordance with the preferred embodiment of the present invention.
Figure 2:
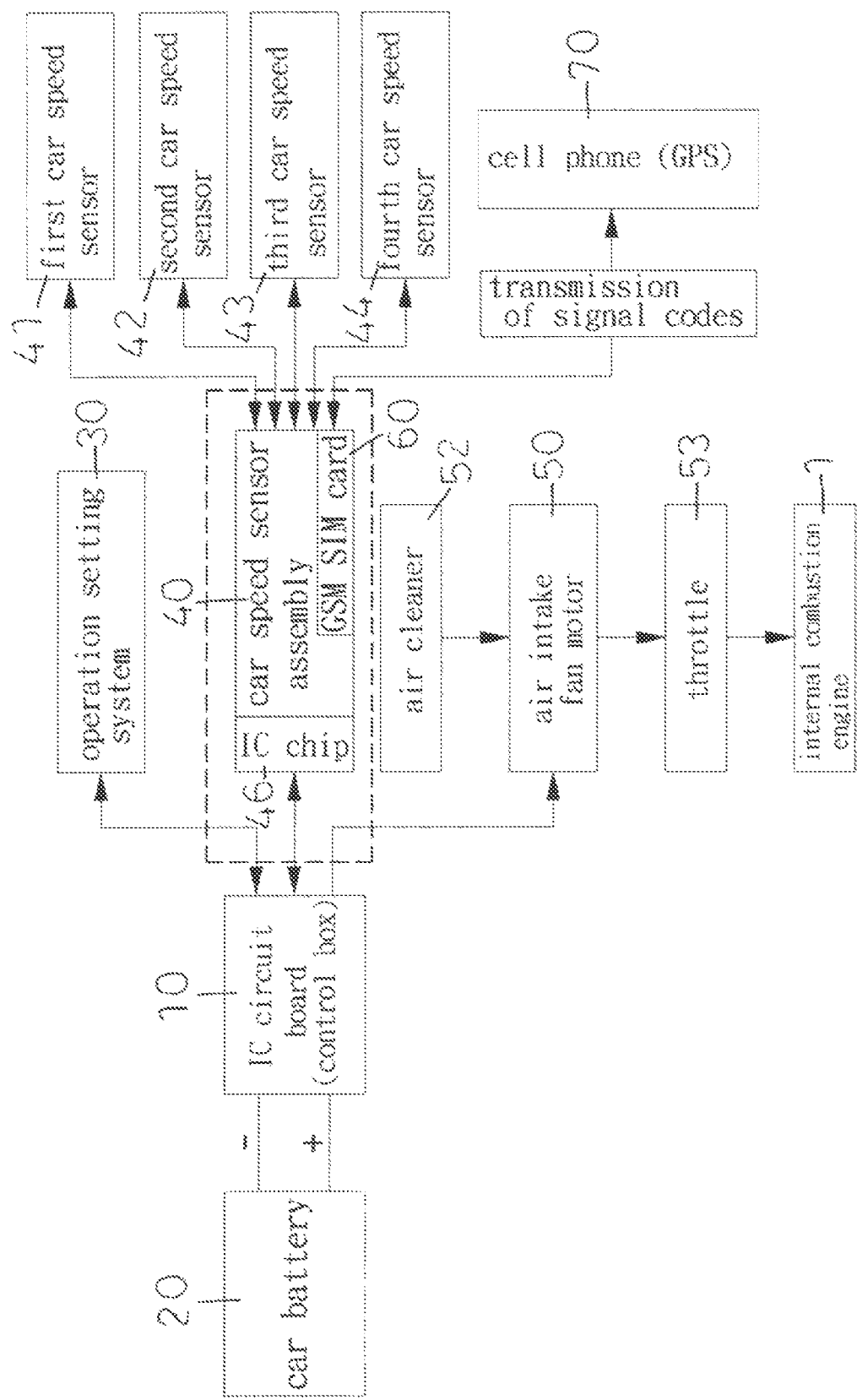
FIG. 2 is a block diagram of the energy saving device in accordance with the preferred embodiment of the present invention.
Figure 3:
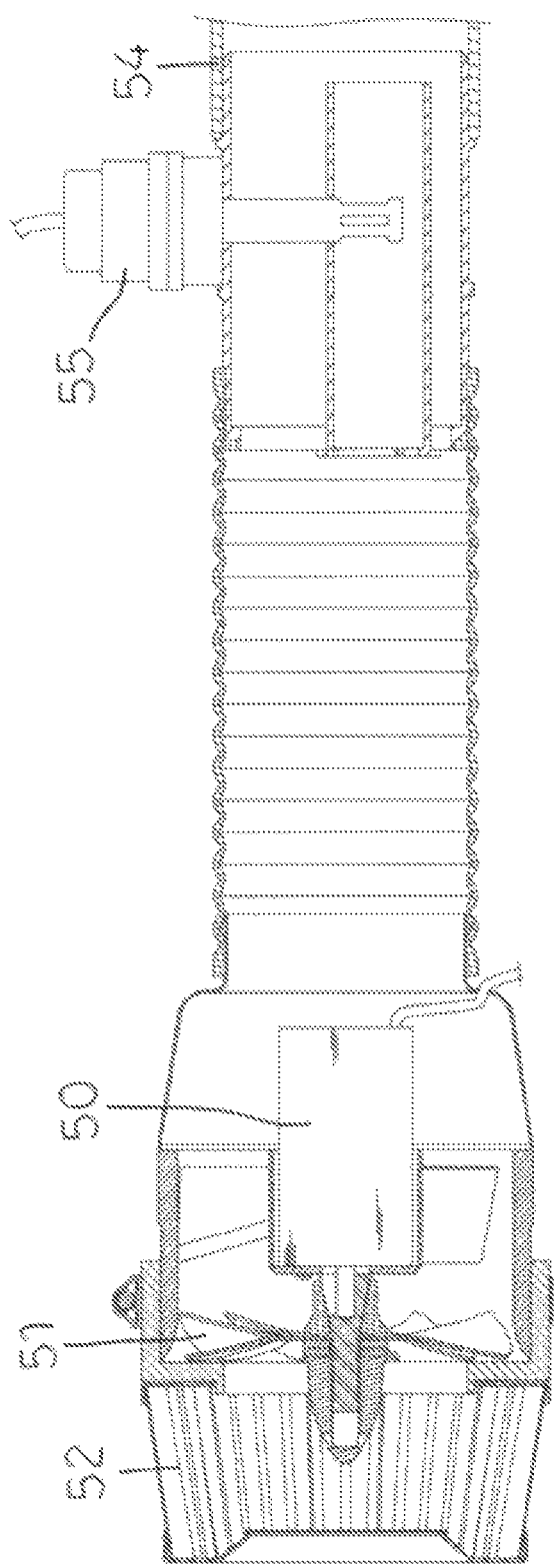
FIG. 3 is a cross-sectional view of an air intake fan motor of the energy saving device in accordance with the preferred embodiment of the present invention.

Referring to the drawings and initially to FIGS. 1-3, an energy saving device in accordance with the preferred embodiment of the present invention comprises a control box 10, a battery 20, an operation setting system 30, a car speed sensor (or detector) assembly 40, and an air intake fan motor 50.

The control box 10 includes an IC circuit board which is electrically connected with the battery 20, the operation setting system 30, the car speed sensor assembly 40, and the air intake fan motor 50.

The battery 20 is electrically connected with the IC circuit board of the control box 10, to provide an electric power to actuate the air intake fan motor 50. Preferably, the battery 20 is a car battery.

The operation setting system 30 is electrically connected with the IC circuit board of the control box 10, and includes an operation setting monitor (or display or screen) 31 which presets a plurality of ranges (or grades or degrees or intervals or spacings) according to a car speed and an air flow rate (or air volume) of the air intake fan motor 50.

The car speed sensor assembly 40 includes a first car speed sensor (or detector) 41 for a car propeller shaft, a second car speed sensor (or detector) 42 for an ABS brake system, a third car speed sensor (or detector) 43 for an EBS brake system, a fourth car speed sensor (or detector) 44 for a PDF spark ignition system, and a fifth car speed sensor (or detector) 45 for a global positioning system (GPS). The car speed sensor assembly 40 is provided with an IC chip 46 which is electrically connected with the IC circuit board of the control box 10. The IC chip 46 of the car speed sensor assembly 40 identifies a car speed information detected by the first car speed sensor 41, the second car speed sensor 42, the third car speed sensor 43, the fourth car speed sensor 44, and the fifth car speed sensor 45, and transmits the car speed information to the IC circuit board of the control box 10.

The air intake fan motor 50 is electrically connected with the IC circuit board of the control box 10. The air intake fan motor 50 is located at a front position of an air inlet pipe 54 of an internal combustion engine 1 that allows entrance of the air. The air intake fan motor 50 drives and rotates an air intake fan 51, and an air cleaner (or filter) 52 is located in front of the air intake fan 51. The air inlet pipe 54 of the internal combustion engine 1 is provided with an air intake flow rate detector 55 and a throttle (or air regulator) 53. The air intake flow rate detector 55 is electrically connected with a fuel (or oil) injection supply device 2. The fuel injection supply device 2 includes a plurality of fuel (or oil) injection pipes 3 which are connected with a plurality of fuel (or oil) inlet ports 4 of the internal combustion engine 1. Thus, the air intake flow rate detector 55 detects the flow rate of the inlet air, and transmits a signal to the fuel injection supply device 2, such that the fuel injection supply device 2 injects a fuel (or an oil) of a predetermined amount.

In the preferred embodiment of the present invention, the car speed sensor assembly 40 is further provided with a SIM (subscriber identity module) card module 60 for a GSM (global system for mobile communications) network. The SIM card module 60 receives a code message (or signal code) emitted from a cell phone 70, and starts the air intake fan motor 50.

In the preferred embodiment of the present invention, the operation setting monitor 31 of the operation setting system 30 presets that the rotation speed of the air intake fan motor 50 increases the air flow rate by a grade when the car speed is increased by fifteen kilometers per hour (15 km/hr).

In the preferred embodiment of the present invention, the operation setting monitor 31 of the operation setting system 30 presets that the rotation speed of the air intake fan motor 50 increases the air flow rate by a grade when the car speed is increased by twenty kilometers per hour (20 km/hr).

Figure 4:
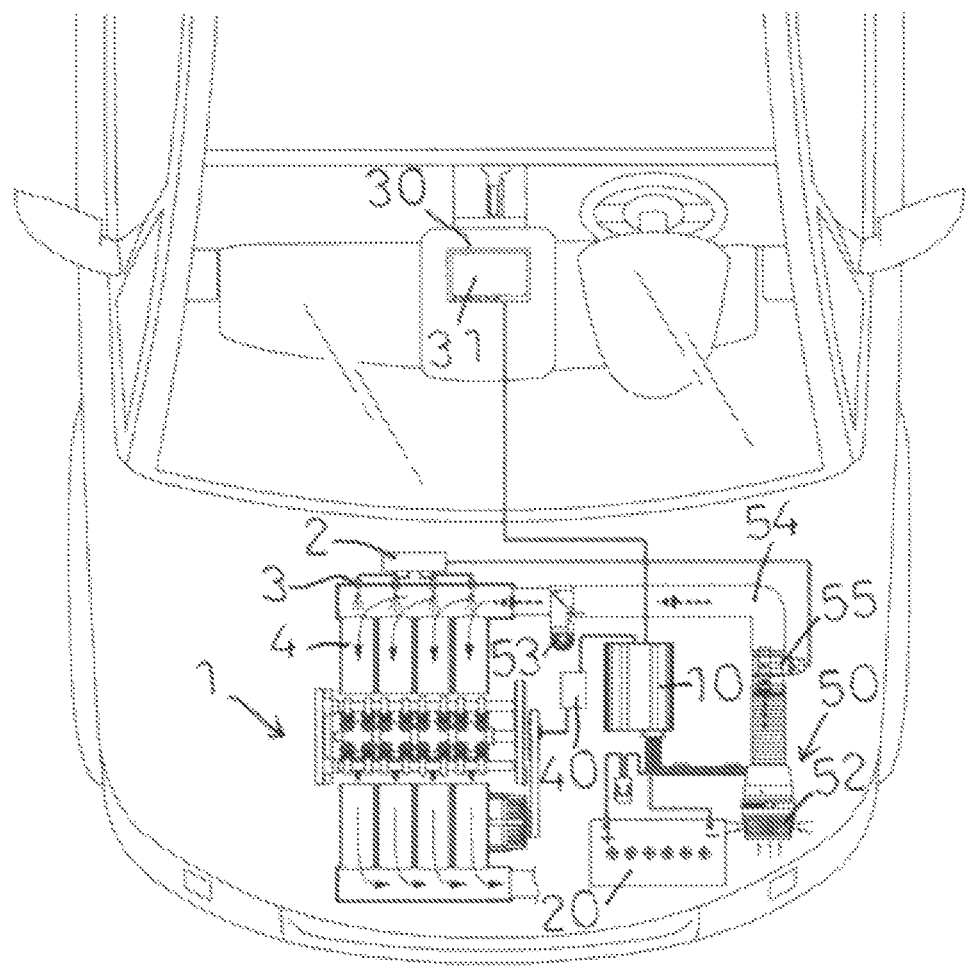
FIG. 4 is a schematic operational view of the energy saving device in accordance with the preferred embodiment of the present invention.

In operation, referring to FIG. 4 with reference to FIGS. 1-3, the operation setting monitor 31 of the operation setting system 30 presets that the rotation speed of the air intake fan motor 50 increases the air flow rate by a grade when the car speed is increased by 15 km/hr or 20 km/hr. In such a manner, when the first car speed sensor 41, the second car speed sensor 42, the third car speed sensor 43, the fourth car speed sensor 44, and the fifth car speed sensor 45 of the car speed sensor assembly 40 detect that the car speed is increased by 15 km/hr or 20 km/hr, the IC chip 46 of the car speed sensor assembly 40 identifies the source of the car speed information. For example, the source is obtained from the first car speed sensor 41, the second car speed sensor 42, the third car speed sensor 43, the fourth car speed sensor 44, or the fifth car speed sensor 45. Then, the IC chip 46 of the car speed sensor assembly 40 transmits the car speed information to the IC circuit board of the control box 10, to control and regulate the rotation speed of the air intake fan motor 50 to correspond to the air flow rate by a grade. Alternatively, the car speed is increased by 30 km/hr or 40 km/hr, the rotation speed of the air intake fan motor 50 corresponds to the air flow rate by two grades. Alternatively, the car speed is increased by 45 km/hr or 60 km/hr, the rotation speed of the air intake fan motor 50 corresponds to the air flow rate by three grades. In the preferred embodiment of the present invention, the energy saving device is available for various cars that use fuels, such as gasoline, diesel oil and the like.

Accordingly, the IC chip 46 of the car speed sensor assembly 40 identifies the car speed information detected by the five car speed sensors 41, 42, 43, 44 and 45 of the car speed sensor assembly 40, and transmits the car speed information to the IC circuit board of the control box 10, and the IC circuit board of the control box 10 controls and regulates the rotation speed of the air intake fan motor 50 according to the grades of the car speed preset by the operation setting system 30 that is controlled by the user, such that the rotation speed of the air intake fan motor 50 increases the air flow rate by a grade when the car speed is increased by a predetermined constant value. In addition, the energy saving device efficiently increases the air intake amount of the internal combustion engine 1, without increasing the rotation speed of the internal combustion engine 1, and without increasing the oil injection amount, such that the fuel is burned completely, thereby preventing the internal combustion engine 1 from producing carbon deposit, and thereby enhancing the working efficiency of the internal combustion engine 1. Further, the car travels a longer distance under the same oil volume, so as to achieve the energy-saving purpose.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. An energy saving device comprising:
a control box, a battery, an operation setting system, a car speed sensor assembly, and an air intake fan motor;
wherein:
the control box includes an integrated circuit (IC) board which is electrically connected with the battery, the operation setting system, the car speed sensor assembly, and the air intake fan motor;

the battery is electrically connected with the IC board of the control box, to provide an electric power to actuate the air intake fan motor;

the operation setting system is electrically connected with the IC board of the control box, and includes an operation setting monitor which presets a plurality of grades according to a car speed and an air flow rate of the air intake fan motor;

the car speed sensor assembly includes a first car speed sensor for a car propeller shaft, a second car speed sensor for an anti-locking braking system (ABS), a third car speed sensor for an electronic braking system (EBS), a fourth car speed sensor for a spark ignition system, and a fifth car speed sensor for a global positioning system (GPS);

the car speed sensor assembly is provided with an IC chip which is electrically connected with the IC circuit board of the control box;

the IC chip of the car speed sensor assembly identifies a car speed information detected by the first car speed sensor, the second car speed sensor, the third car speed sensor, the fourth car speed sensor, and the fifth car speed sensor, and transmits the car speed information to the (IC) circuit board of the control box;

the car speed sensor assembly is further provided with a subscriber identity module (SIM) card module for a global system for mobile communication (GSM) network;

the SIM card module receives a code message emitted from a cell phone, and starts the air intake fan motor;

the air intake fan motor is electrically connected with the IC board of the control box;

the air intake fan motor is located at a front position of an air inlet pipe of an internal combustion engine; and the air intake fan motor drives and rotates an air intake fan.

2. The energy saving device of claim 1, wherein the operation setting monitor of the operation setting system presets that the rotation speed of the air intake fan motor increases the air flow rate by a grade when the car speed is increased by fifteen kilometers per hour (15 km/hr).

3. The energy saving device of claim 1, wherein the operation setting monitor of the operation setting system presets that the rotation speed of the air intake fan motor increases the air flow rate by a grade when the car speed is increased by twenty kilometers per hour (20 km/hr).

4. The energy saving device of claim 1, wherein the car speed sensor assembly is wire connected with the control box.

5. The energy saving device of claim 1, wherein the car speed sensor assembly is directly connected with the control box.

6. The energy saving device of claim 1, wherein the car speed sensor assembly has a wire transmission to the control box.

7. The energy saving device of claim 1, wherein the first car speed sensor, the second car speed sensor, the third car speed sensor, the fourth car speed sensor, and the fifth car speed sensor are wire connected with the IC chip of the car speed sensor assembly.

8. The energy saving device of claim 1, wherein the operation setting system is arranged outside of the control box.

9. The energy saving device of claim 1, wherein the operation setting system is externally connected with the control box.

10. The energy saving device of claim 1, wherein the air intake fan motor is directly connected with the IC board of the control box.

* * * * *